United States Patent Office 3,530,110
Patented Sept. 22, 1970

3,530,110
WATER-INSOLUBLE DYESTUFFS CONTAINING A
2-CHLORO-BENZOTHIAZOLE-6-AZO GROUP
Walter Jenny and Stefan Hari, Basel, and Karl Seitz,
Oberwil, Basel-Land, Switzerland, assignors to Ciba
Limited, Basel, Switzerland, a company of Switzerland
No Drawing. Continuation-in-part of application Ser. No.
205,124, June 25, 1962. This application Oct. 9, 1968,
Ser. No. 766,320
Claims priority, application Switzerland, June 23, 1961,
7,369/61; May 9, 1962, 5,556/62
Int. Cl. C09b 29/08, 29/16, 29/38
U.S. Cl. 260—158
7 Claims

ABSTRACT OF THE DISCLOSURE

A water-insoluble azo dyestuff of the formula

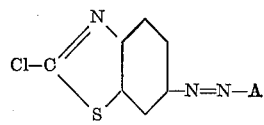

wherein A is the residue of a coupling component which is free from water-solubilizing groups, said dyestuff being useful as disperse dyestuffs for fibers containing cellulose and which dyeings are distinguished by purity of tint, good light fastness, and excellent wash fashness.

CROSS-REFERENCE TO RELATED APPLICATIONS

This application is a continuation-in-part of application Ser. No. 205,124 filed June 25, 1962, and now abandoned.

The present invention provides new, valuable organic dyestuffs that contain a 2-halogen-thiazole radical. The invention is concerned mainly with such dyestuffs that contain a benzthiazole carboxylic acid radical of that kind.

The 2-halogenthiazole radical can be bound to an aromatic nucleus of the dyestuff molecule, for example, either directly to an azo bridge or through an amino bridge or through a sulfur or oxygen atom or through an $SO_2$ grouping or through a carbamide or sulfonamide group. If it is bound to an amino group, the nitrogen atom of the said amino bridge can be further substituted by an aliphatic, cycloaliphatic, araliphatic or aromatic radical. Especially valuable are the dyestuffs of the present invention that contain at least one group of the formula (1)

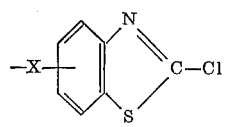

in which X represents an

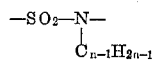

group or

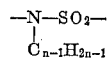

or an —N=N— bridge, but more especially a

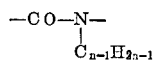

or an

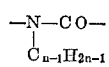

group, in which $n$ represents a whole number, preferably 1.

In addition to a group of the kind defined above the dyestuffs of the invention can also contain groups imparting solubility in water, for example, a methyl sulfone group or, advantageously, at least one strongly acidic group imparting solubility in water such, for example, as a sulfato group, a thiosulfato group, a carboxyl group or a sulfonic acid group. They may also contain further substituents that do not increase the solubility in water, as, for example, halogen atoms or nitro, acylamino, alkyl or alkoxy groups.

The dyestuffs of the invention can be prepared from dyestuff components that already contain the said 2-halogen-thiazole radicals. Such dyestuff components can be prepared by methods in themselves known, for example, by the acylation of suitable compounds by means of 2-halogen-benzthiazole carobxylic acid halides, especially with 2-chlorobenzthiazole-5-, -6- or -7-carboxylic acid chloride.

Compounds suitable for this purpose are those which contain an easily acylatable group, for example, an acylatable amino group, such, for example, as a monoalkylamino group or a primary amino group. In addition to such an acylatable group there must be present in the compounds, in the case of diazo components, a less easily acylatable amino group or a nitro group to be reduced after the acylation and, in the case of coupling components, there must be present either a less easily acylatable amino group that permits coupling or a hydroxyl group that permits coupling. As less easily acylatable amino groups there may be mentioned more especially those vicinal to an acidic group, for example, a sulfonic acid group. Amino-hydroxy compounds can be acylated in such manner that the esterification of the hydroxyl group is avoided, for which purpose it is known that a non-alkaline reaction medium is suitable.

Instead of introducing the said radicals into the dyestuff components before the dyestuff is manufactured, they can also be introduced into the finished dyestuff. Thus, by acylating dyestuffs, especially vat dyestuffs and vat dyestuff intermediate products that contain an acylatable amino group or hydroxyl group, more especially an —NH₂— group, for example, with 2-chlorobenzthiazole carboxylic acid chloride, there are obtained dyestuffs that contain a radical of the Formula 1.

The 2-halogen-benzthiazole radical can also be introduced into finished dyestuffs by acylating the compound of the formula (2)

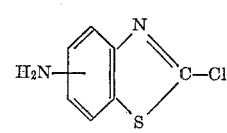

or acylatable components that contain a radical of the Formula 1 and an acylatable amino or hydroxyl group, with dyestuff sulfonic acid halides or dyestuff carboxylic acid halides.

The azo dyestuffs can also be manufactured by coupling compounds that are capable of coupling by virtue of the presence of a hydroxyl group or an amino group with diazo compounds of the amine of the Formula 2. Types of coupling compounds which may be mentioned are aminobenzenes, hydroxybenzenes, hydroxynaphthalenes, pyrazolones and hydroxyazobenzenes. As coupling components that can be used in this process there may be mentioned, for example, aniline, toluidine, xylidine, cresidine, dimethyl- and diethylaniline, di(cyano-ethyl)-aniline, and β-keto-carboxylic acid esters or amides that are capable of coupling in α-position, for example, acetoacetic acid arylides, pyrazolones, especially 5-pyrazolones, that are capable of coupling in 4-position, for example, 3-methyl-5-pyrazolone, 1-phenyl-3-methyl-5-pyrazolone, 1-phenyl-3-methyl-5-pyrazolone-2'-, -3'- or -4'-sulfonic acid, 1-phenyl-5-pyrazolone-3-carboxylic acid, 5-pyrazolone-3-carboxylic acid amides, barbituric acid, hydroxyquinolines, such, for example, as 8-hydroxyquinoline, 2:4-dihydroxy-quinoline, and phenols, such for example, as para-cresol, 4-acetylamino-1-hydroxybenzene, 4-methyl-2-acetylamino-1-hydroxybenzene, 2-carboxy-1-hydroxybenzene, naphthols, such, for example, as α- or β-naphthol, α- or β-naphthylamine, 1-aminonaphthalene-6-, -7- or -8-sulfonic acid, 2-hydroxynaphthalene sulfonic acid amides, but more especially amino- and/or hydroxynaphthalene sulfonic acid or the N-alkyl or N-aryl derivatives thereof, such for example, as 1-hydroxynaphthalene-3-, -4-, -5-, or -8-sulfonic acid, 2-hydroxynaphthalene-4-, -5-, -6-, -7-, or -8-sulfonic acid, 1:8-dihydroxynaphthalene-3:6-disulfonic acid, 2-hydroxynaphthalene-3:6- or -6:8-disulfonic acid, 1-hydroxynaphthalene-3:6- or -3:8-disulfonic acid, 2-aminonaphthalene-6-sulfonic acid, 1-amino-8-hydroxynaphthalene-2:4-, -3:6- or -4:6-disulfonic acid, 2-amino-8-hydroxynaphthalene-6-sulfonic acid, 2-methylamino-5-hydroxynaphthalene-7-sulfonic acid, 2-amino-5-hydroxynaphthalene-7-sulfonic acid and the N-acyl derivatives of aminonaphthol sulfonic acids that contain as acyl radical, for example, an acetyl radical, a propionyl radical, a butyryl radical, a chloracetyl radical, a benzoyl radical, an ortho- or meta- or para-chlorobenzoyl radical, a nitrobenzoyl radical, a tertiary butyl-benzoyl radical, a 3'- or 4'-aminobenzoyl radical, a methanesulfonyl radical or an ethane-sulfonyl radical, a para-toluene-sulfonyl radical or a chlorobenzene-sulfonyl radical or a carbomethoxy or carboethoxy radical or an acyl radical derived from a cyanuric acid, for example, a radical of the formula

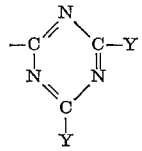

in which the two symbols Y represent halogen atoms, hydroxyl groups or amino groups, especially substituted amino groups. There may also be used as azo components 5:5'-dihydroxy-2:2'-dinaphthyl urea-7:7'-disulfonic acid and 5:5'-dihydroxy-2:2'-dinaphthylamine-7:7'-disulfonic acid that, like the 1-amino-8-hydroxynaphthalene-3:6-disulfonic acid can, if necessary, be coupled twice with the given diazo components, and also compounds capable of coupling that already contain azo groups, for example, the monoazo compounds that can be prepared, for example, by the acid coupling of simple diazo compounds of the benzene or naphthalene series (for example, diazotized naphthylamines, anilines such for example, as chloranilines or nitro-anilines, toluidines, aminobenzene sulfonic acids, chloro or nitro-aminobenzene sulfonic acid, aminobenzoic acids or nitro-aminobenzoic acids or nitro-aminophenols) with 2-amino-5-hydroxynaphthalene-7-sulfonic acid or with 1-hydroxy-8-aminonaphthalene-3:6-disulfonic acid.

Organic dyestuffs that belong to a very wide variety of classes can be manufactured by the methods described herein, for example, disperse dyestuffs, stilbene dyestuffs, azine dyestuffs, dioxazine dyestuffs, xanthone and thioxanthone dyestuffs, acid phthalocyanine dyestuffs, acid anthraquinone dyestuffs, azo dyestuffs, mono- and poly-azo dyestuffs that are free from metal and mono- and poly-azo dyestuffs that contain metal and, in particular, vat dyestuffs. Especially good results are obtained with soluble dyestuffs that have either no affinity for cotton or at least no pronounced affinity for cotton, and with vat dyestuffs.

As examples of dyestuffs that contain acylatable amino groups and that can be acylated in accordance with the process of the invention, for example, with 2-halogen-benzthiazole sulfonic acid halides or preferably with 2-halogenbenzthiazole carboxylic acid halides, there may be mentioned the following: aminoazo dyestuffs that are obtained by hydrolysis of acylaminoazo dyestuffs, by reduction of the nitro group of azo dyestuffs that contain nitro groups or by coupling diazotized aromatic amines with azo components that contain acylatable amino groups, such, for example, as 1-amino-phenyl-5-pyrazolones, meta-acylamino-aminobenzenes, aminonaphthol sulfonic acids, etc., amino dyestuffs of the anthraquinone series such, for example, as 1-amino-4-(3'- or -4'-aminophenylamino)-anthraquinone-2-sulfonic acid, 1-amino-4-(4'-aminophenylamino)-anthraquinone-2'- or -3'-sulfonic acid, 1 - amino-4-(4'-aminophenylamino)-anthraquinone-2:2'- or -2:3'-disulfonic acid, 1-amino-4-(3'-aminophenylamino)-anthraquinone-2:4' - disulfonic acid, 1-amino-4-(4' - aminophenylamino)-anthraquinone-2:3':6-, -2:3':7- or -2:3':8-trisulfonic acid, 1-amino-4-(4' - aminophenylamino)-anthraquinone-2:2':5-trisulfonic acid, 1-amino-4-(3'-aminophenylamino)-anthraquinone-2:2':8 - trisulfonic acid and, more especially, vattable amines, for example, α-aminoanthraquinone, 6- or 7-chloro-1-aminoanthraquinone, 4-chloro- or 5-nitro-1-aminoanthraquinone, 4-, 5- or 8 - benzoylamino - 1-aminoanthraquinone, 1:5-dihydroxy-4:8-diaminoanthraquinone-2:6-disulfonic acid, 1:4- or 1:5-diaminoanthraquinone-2-sulfonic acid, 4-, 5- or 8-amino - 1 - acylaminoanthraquinones that are obtained by acylation of 1-aminoanthraquinones which contain a nitro group in 4-, 5- or 8-position with sulfo- or disulfo-benzoic acid halides and subsequent reduction of the nitro group to an amino group), 4-aminoanthraquinone-2:1 (N)-acridones, 4:4'-, 4:5'- or 5:5' - diamino - 1:1'-dianthrimide carbazole, aminopyranthrones, mono- and di-aminoacedianthrone, aminoisodibenzanthrones, aminodibenzanthrone, aminoanthranthrone, aminoflavanthrone, aminopyranthrone, 4- or 5-amino-1:1'-dianthrimide carbazole, 4- or 5-amino-5'-benzoylamino-dianthrimide carbazole, aminodibenzpyrene-quinone, and mono- and di-amino-trianthrimide carbazoles, for example, 8':8''-di-amino-1':1:5:1''-trianthrimide carbazole, and perylene-tetracarboxylic acid di-(para- or meta-aminophenyl)-imide, the compounds of the formulae

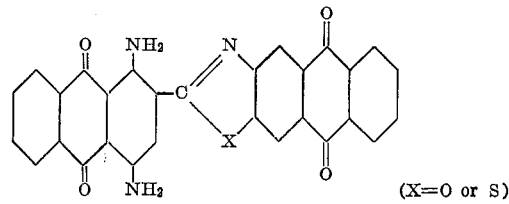

(X=O or S)

and

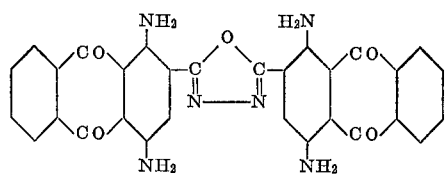

and of the formula

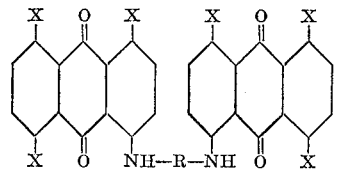

in which at least four of the symbols X represent hydrogen atoms and the remainder represent $NH_2$ groups, whereas R represents a triazine radical or a

—CO—R—CO— group, in which R is a heterocyclic or an aromatic radical; furthermore, there are also obtained, for example, from 1 mol of a tri- or tetra-sulfonic acid chloride of a colored anthraquinone derivative or from one mol of a phthalocyanine-tri- or tetra-sulfonic acid chloride by partial amidation with one mol of a diamine, for example, with one mol of a diamino-benzene sulfonic acid or the monoacyl derivatives thereof, very valuable dyestuffs that can be used as starting materials for the present process, which dyestuffs contain, after hydrolysis of the unreacted sulfonic acid chloride groups and the acylamino groups that may be present, an acylatable amino group which, in accordance with the process of the invention, can be acylated with the aforesaid 2-halogen-benzthiazole carboxylic acid chlorides; valuable dyestuffs can also be obtained from 1 mol of a tri- or tetra-sulfonic acid chloride of a colored anthraquinone derivative or from one mol of a phthalocyanine-tri- or tetra-sulfonic acid chloride by partial amidation with the amine of the Formula 2.

The acylation of such dyestuffs that contain an acylatable amino group with the aforesaid 2-halogenbenzthiazole carboxylic acid halides is advantageously carried out in the presence of agents capable of binding acid, as for example, sodium acetate, sodium hydroxide or sodium carbonate, for example, in organic solvents or at a relatively low temperature in an aqueous medium.

The dyestuffs of the invention are new. They are suitable for dyeing or printing a very wide variety of materials, especially polyhydroxylated materials of fibrous structure such, for example, as materials that contain cellulose, including both synthetic fibers, for example, made from regenerated cellulose, and natural materials, for example, cellulose, linen and, more especially, cotton. They are suitable for dyeing by the so-called direct dyeing method, and also for application by printing and pad-dyeing methods, especially from aqueous alkaline solutions that may contain a large proportion of salt, for example, by methods in which the dyestuffs are fixed on the goods by a heat treatment, for example, by steaming, in the presence of alkali.

The dyeings so obtained on cellulosic fibers are thoroughly rinsed, first with cold water and then with hot water, in order to remove unfixed dyestuff and to improve their properties of wet fastness. It is also of advantage to subject them to a treatment with a dilute boiling solution of a non-ionic detergent or dispersing agent, for example, for 5 to 10 minutes.

Dyeings on fibers containing cellulose produced with the dyestuff of the invention are generally distinguished by the purity of their tints, by their good fastness to light and, above all, by their excellent fastness to washing.

The dyestuffs of the invention which are soluble in water are also suitable for dyeing or printing materials that contain nitrogen, such as leather, silk and especially wool, as well as polyurethane fibers from a weakly alkaline, neutral or acid bath, for example from a bath acidified with acetic acid. Dyeings produced on wool with such dyestuffs display excellent fastness to washing and milling.

Dyeings produced on cellulose with the vat dyestuffs of the invention by the known vat-dyeing methods are generally fast to dry cleaning and migration. The dyed fabrics can therefore be coated with synthetic resins, for example, with polyvinyl chloride, without the dyestuff migrating into the resin, which is specially important in the manufacture of artificial leather.

The following examples illustrate the invention. Unless otherwise stated, the parts and percentages are by weight, and the relationship of parts by weight to parts by volume is the same as that of the gram to the milliliter.

EXAMPLE 1

2 parts of 1-amino-5-benzoylamino-anthraquinone are dissolved in 40 parts of hot ortho-dichlorobenzene, 1.4 parts of 2-chlorobenzthiazole-6-carboxylic acid chloride are added to the solution so obtained, and the whole is boiled for 30 minutes under reflux. The dyestuff of the formula

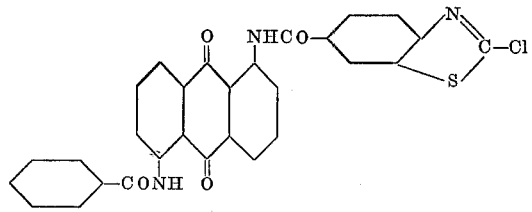

that precipitates thereby is isolated by suction filtration, washed with hot alcohol and then dried in vacuo. It dyes cotton and regenerated cellulose yellow tints possessing good properties of wet fastness and excellent fastness to solvents when applied, for example, by the dyeing prescription given in the last paragraph of this example.

A similar dyestuff is obtained by acylating one mol of 1:5-diaminoanthraquinone with 2 mols of 2-chlorobenzthiazole-6-carboxylic acid chloride.

If, in this example (first paragraph) the same amount of 2-chlorobenzthiazole-5-carboxylic acid chloride is used instead of 2-chlorobenzthiazole-6-carboxylic acid chloride, there is obtained a dyestuff of the formula

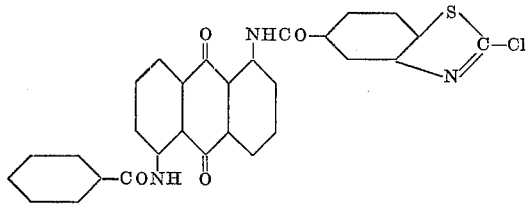

which possesses virtually the same properties.

2.5 parts of the dyestuff described in the first paragraph are finely ground for 24 hours with 22.5 parts of an aqueous solution of sodium diisobutyl-naphthalene-sulfonate of 10% strength in a ball mill. 7.5 parts of the paste so obtained are suspended in 250 parts of warm water. The dyestuff suspension so obtained is added to a solution of 10 parts by volume of sodium hydroxide solution of 30% strength and 6 parts of sodium dithionite in 1750 parts of water, the said solution having a temperature of 50° C., and vatted therein for 1 minute. 50 parts of cotton are dyed for 45 minutes at 50 to 60° C. in the dyebath so obtained in the presence of 60 parts of sodium chloride. After dyeing, the cotton is rinsed and then soaped at the boil.

EXAMPLE 2

4.2 parts of amino-acedianthrone are dissolved in 140 parts of hot ortho-dichlorobenzene, 2.5 parts of 2-chlorobenzthiazole-6-carboxylic acid chloride are added to the solution so obtained, and the whole is stirred for 24 hours at 170° C. The dyestuff of the formula

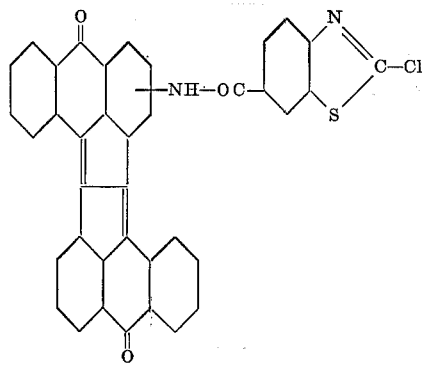

that precipitates thereby is isolated by suction filtration, washed with hot alcohol, and then dried. It dyes cotton and regenerated cellulose pure brown tints possessing excellent properties of wet fastness, excellent fastness to light and excellent fastness to solvents when applied, for example, by the dyeing prescription given in the last paragraph of Example 1.

Example 3

1.44 parts of 4:4'-diamino-1:1'-dianthrimide carbazole are dissolved in 75 parts of hot ortho-dichlorobenzene, 2.0 parts of 2-chlorobenzthiazole-6-carboxylic acid chloride are added to the solution so obtained, and the whole is stirred for 3 hours at 170° C. The dyestuff of the formula

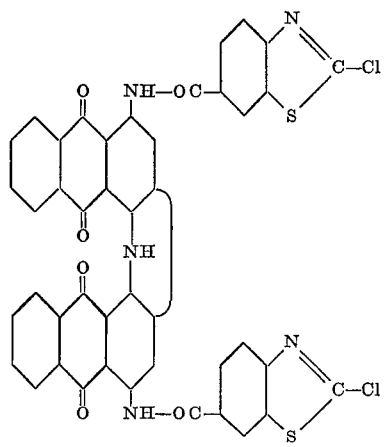

that precipitates thereby is isolated by suction filtration, washed with hot alcohol, and then dried.

The dyestuff so obtained dyes cotton and regenerated cellulose grey tints possessing excellent properties of wet fastness, excellent fastness to light and excellent fastness to solvents when applied by the method described in the last paragraph of Example 1.

Example 4

2.2 parts of 1 - (4' - aminobenzoylamino)-5-benzoyl-aminoanthraquinone are dissolved in 75 parts of hot ortho-dichlorobenzene, 1.1 parts of 2 - chlorobenzthiazole-6-carboxylic acid chloride are added to the solution so obtained, and the whole is boiled for 30 minutes under reflux. The crystalline dyestuff of the formula

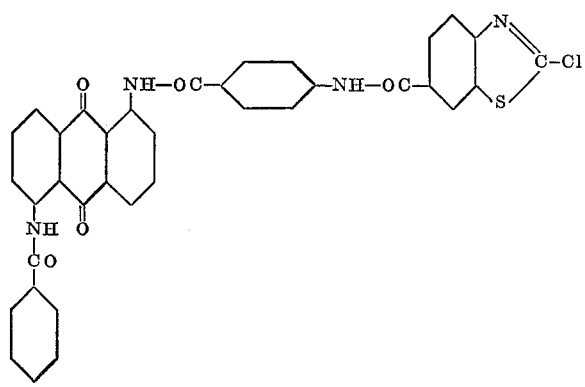

that precipitates thereby is isolated by suction filtration, washed with hot alcohol, and then dried. It dyes cotton and regenerated cellulose clear, strong and fast yellow tints when applied by the process given in the last paragraph of Example 1.

Example 5

2.35 parts of monoamino-dibenzanthrone are suspended in 100 parts of nitrobenzene, the suspension is heated to 120° C., and to it are added 1.3 parts of 2-chlorobenzthiazole-6-carboxylic acid chloride. The whole is stirred for 1 hour at 160° C., whereupon 1 part of pyridine is added, and stirring is continued for further 3 hours at 170° C. After cooling the reaction mixture, the dyestuff of the formula

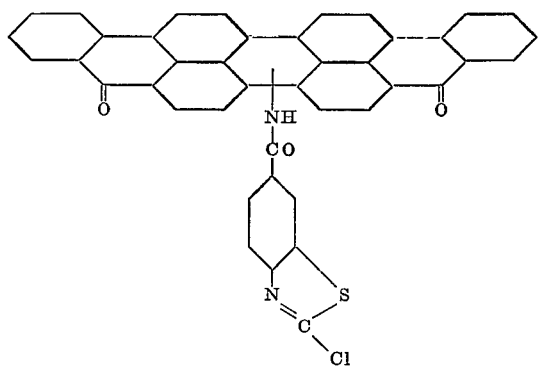

which is isolated by suction filtration is washed thoroughly with hot alcohol, and then dried. The dyestuff so obtained dyes cotton and regenerated cellulose blue-black tints possessing excellent properties of wet fastness, excellent fastness to light and excellent fastness to solvents when applied, for example, by the dyeing prescription given in the last paragraph of Example 1.

Example 6

To a fine suspension of 1.5 parts of 1-amino-4-phenyl-aminoanthraquinone in 50 parts of nitrobenzene are added, at 120° C., 1.2 parts of 2-chlorobenzthiazole-5-carboxylic acid chloride, the whole is stirred for 30 minutes at 165° C. and then allowed to cool. The dyestuff so obtained and having the formula

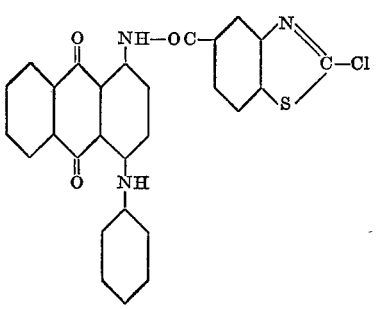

is isolated by suction filtration, washed with hot ethanol, and then dried. It dyes cotton and regenerated cellulose dark blue tints possessing good fastness to washing, good fastness to light and good fastness to solvents when applied, for example, by the dyeing method given in the last paragraph of Example 1.

Example 7

To a suspension of 2.7 parts of 1:5-diamino-4:8-dihydroxy-anthraquinone in 75 parts of ortho-dichlorobenzene are added, at 100° C., 4.61 parts of 2-chloro-benzthiazole-6-carboxylic acid chloride, the whole is stirred for 30 minutes at 160° C. and then allowed to cool. The dyestuff of the formula

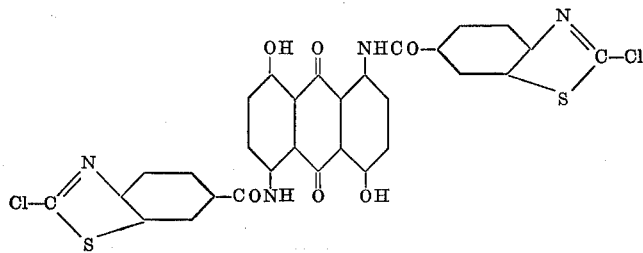

that precipitates thereby is isolated by filtration, washed thoroughly with hot alcohol and then dried in vacuo at 80° C. The dyestuff so obtained dyes cotton and regenerated cellulose strong and pure violet tints when applied, for example, by the dyeing procedure given in the last paragraph of Example 1.

Example 8

2.0 parts of 1-amino-5-(4'-carboxy-benzoylamino)-anthraquinone are dissolved in 50 parts of hot ortho-dichlorobenzene, 1.2 parts of 2 - chlorobenzthiazole-6-carboxylic acid chloride are added to the solution so obtained, and the whole is stirred for 30 minutes at 160° C. The dyestuff that precipitates when the reaction mixture has cooled has the formula

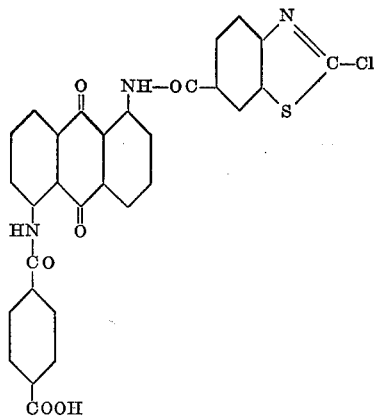

and is isolated by suction filtration, washed with hot alcohol, and then dried.

When in the dry state, the dyestuff so obtained is an orange powder and it dyes cotton and regenerated cellulose pure yellow tints possessing excellent fastness to washing and excellent fastness to solvents when applied by the process given in the following paragraph.

0.75 part of the dyestuff obtained as described in the first paragraph is pasted in 250 parts of water. The dyestuff suspension so obtained is introduced into a solution of 10 parts by volume of sodium hydroxide solution of 30% strength and 6 parts of sodium hydrosulfite in 1750 parts of water, the said solution having a temperature of 35° C., and vatting takes place immediately. 50 parts of cotton are dyed for 45 minutes at 30 to 40° C. in the dyebath so obtained in the presence of 60 parts of sodium chloride. After dyeing, the cotton is oxidized, washed, acidified, well rinsed, and then soaped at the boil.

Example 9

To a suspension of 4.3 parts of the dyestuff intermediate of the formula

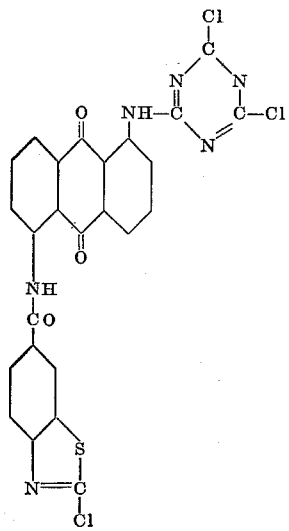

in 60 parts of nitrobenzene and 4 parts of N:N-diethylaniline is added, at 140° C., 1.0 part of 3-aminobenzoic acid, the whole is stirred for 5 hours at 140° C., cooled, and then slowly diluted with a mixture of 75 parts of benzene and 75 parts of ether. The dyestuff of the formula

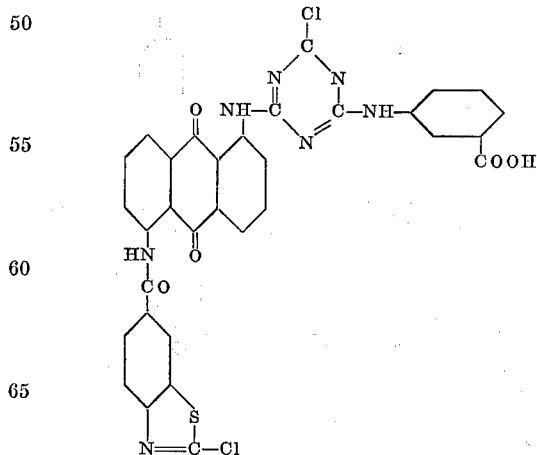

that precipitates thereby is isolated by filtration, washed with ether, and then dried in vacuo at 60° C. It is in the form of a yellow powder and dyes cotton and regenerated cellulose pure orange tints possessing good properties of fastness and exhibiting high tinctorial strength when applied, for example, by the dyeing method given in the last paragraph of Example 8.

The dyestuff intermediate can be prepared as follows:

To a suspension of 4.3 parts of the compound of the formula

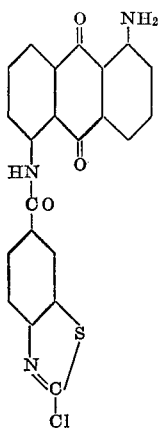

in 100 parts of nitrobenzene is added, at 140° C., a solution of 6.0 parts of cyanuric chloride in 25 parts of nitrobenzene, and the mixture is stirred for 6 hours at 145° C. The resulting solution is allowed to cool. The crystalline precipitate is isolated by suction filtration, and washed with ether, and then dried.

Example 10

To a suspension of 3.0 parts of 1-(4'-aminobenzoyl)-amino)-4-benzoylamino-anthraquinone-in 50 parts of nitrobenzene are added, at 140° C., 1.5 parts of 2-chloro-benzthiazole-5-carboxylic acid chloride, the whole is stirred for 30 minutes at 165° C., and then allowed to cool. The dyestuff of the formula

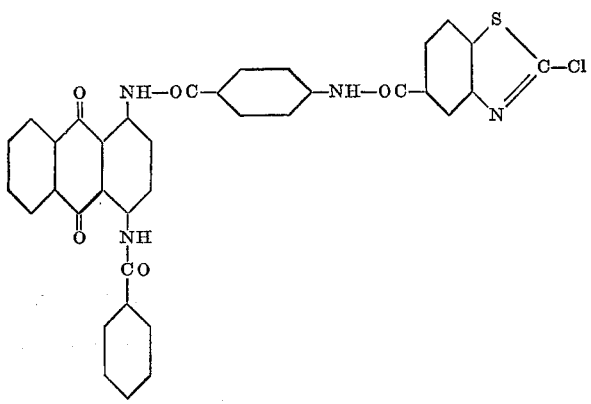

so obtained is isolated by suction filtration, washed with hot ethyl-alcohol, and then dried. It dyes cotton and regenerated cellulose red tints possessing good properties of fastness when applied, for example, by the dyeing method given in the last paragraph of Example 1.

Example 11

To a fine suspension of 2.9 parts of the compound of the formula

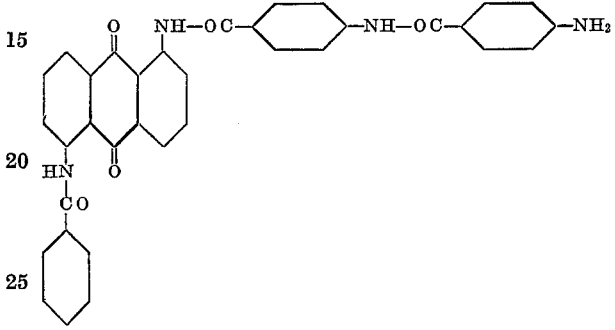

in 50 parts of nitrobenzene and 0.2 part by volume of pyridine are added, at 140° C., 1.2 parts of 2-chloro-benzthiazole-5-carboxylic acid chloride, and the whole is stirred for 16 hours at that temperature.

The isolated dyesuff of the formula

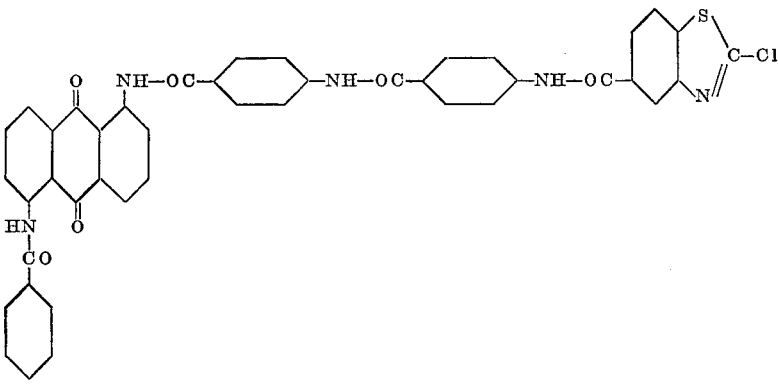

is boiled up in ethyl alcohol, isolated by suction filtration, and then dried. It is in the form of a yellow powder that dyes cotton and regenerated cellulose yellow tints possessing very good properties of wet fastness when applied by the method described in Example 1.

Example 12

To a fine suspension of 2.0 parts of 2-(1':4'-diamino-anthraquinonyl - 2') - 5:6 - phthaloylbenzthiazole in 80 parts of nitrobenzene and 0.5 part by volume of pyridine are added, at 150° C., 1.2 parts of 2-chlorobenzthiazole-7-carboxylic acid chloride, the whole is stirred for 1 hour at 150° C., and then for 3 hours at 165° C., and then cooled. The isolated dyestuff of the formula

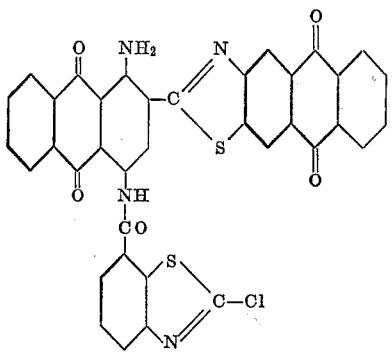

is boiled up in ethylalcohol, isolated by suction filtration, and then dried. It is in the form of a violet-blue powder that dyes cotton and regenerated cellulose strong blue tints possessing excellent properties of wet fastness, excellent fastness to light, and excellent fastness to solvents when applied by the method described in Example 1.

Example 13

To a solution of 1.2 parts of 1-aminoanthraquinone in 50 parts of nitrobenzene are added, at 140° C., 210 parts of the compound of the formula

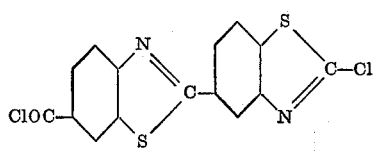

the whole is stirred for 3 hours at 165° C., and then allowed to cool. The dyestuff of the formula

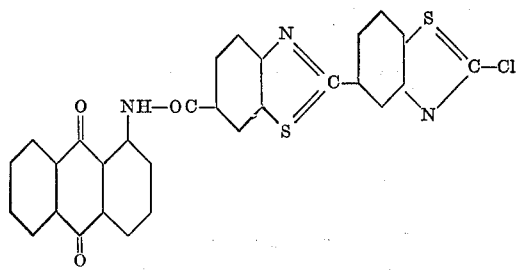

that precipitates thereby is isolated by suction filtration, washed with hot ethylalcohol, and then dried. It is in the form of a greenish yellow powder that dyes cotton and regenerated cellulose fast, greenish yellow tints when applied by the method described in Example 1.

The acid chloride used for the acylation can be prepared as follows:

3.0 parts of 2-[2' - chlorobenzthiazolyl - (5')]-benzthiazole-6-carboxylic acid, which is prepared by condensation of 5-carboxy - 2 - amino - thiophenol-chlorhydrate with 2-chlorobenzthiazole - 5 - carboxylic acid chloride in pyridine, are suspended in 40 parts of thionyl chloride and 0.5 part by volume of dimethylformamide, and the suspension is stirred for 1 hour at 80° C. A clear solution is formed. The excess thionyl chloride is distilled off in vacuo. The residue is recrystallized from nitrobenzene. The pale yellow crystalline acid chloride so obtained melts at 314° C.

EXAMPLE 14

To 1.8 parts of the aminoanthraquinone derivative of the formula

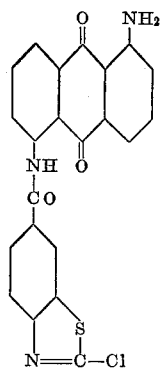

in 40 parts of ortho-dichlorobenzene are added, at 140° C., 1.5 parts of 2-(4' - diphenyl) - benzthiazole-6-carboxylic acid chloride, and the whole is stirred for 30 minutes at 165° C. The resulting solution is allowed to cool. The dyestuff of the formula

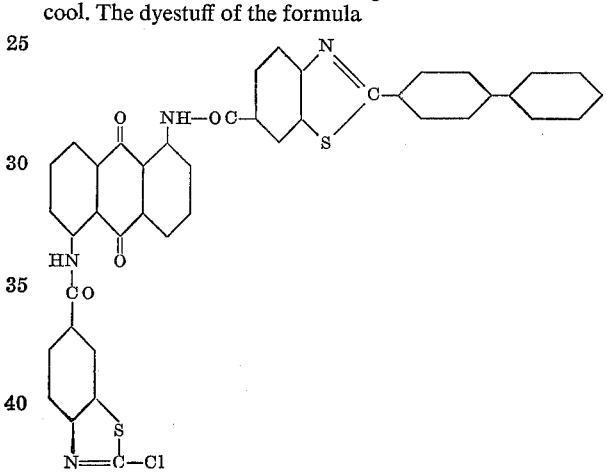

that precipitates thereby is isolated by suction filtration, washed with hot ethylalcohol and then dried.

2 parts of the dyestuff so obtained are dissolved, at 5° C., in 80 parts of oleum of 1% strength. The solution so obtained is stirred for 5 minutes at that temperature, and then poured into 400 parts of ice water. The precipitated dyestuff is isolated and then suspended in 75 parts of water. The suspension so obtained is adjusted to a pH value of 9.5 with sodium hydroxide solution of 33% strength, stirred for 1 hour at 50° C., its pH value adjusted to 7 with dilute hydrochloric acid, 8 parts of sodium chloride are added and the whole is then allowed to cool. The dyestuff is isolated by filtration and then dried. It corresponds to the formula

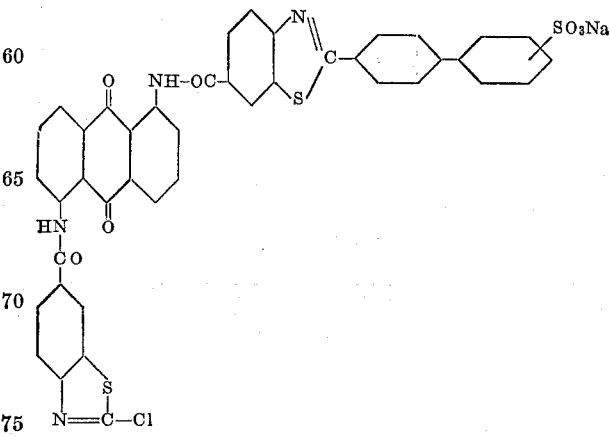

and dyes cotton and regenerated cellulose strong yellow tints possessing quite good properties of fastness when applied by the method described in Example 8.

Example 15

To a solution of 1.39 parts of 1:5-diaminoanthraquinone-2-sulfonic acid in 20 parts of N-methylpyrazolidone is added, at 120° C., 1.0 part of 2-chlorobenzthiazole, and the whole is allowed to cool while constantly stirring. The crystalline deystuff of the formula

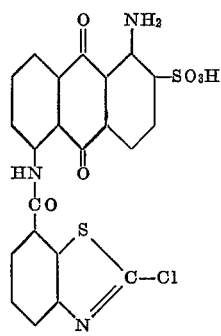

that precipitates thereby is isolated by suction filtration, washed with ether, and then dried. It is in the form of a shiny orange-colored crystal mass that dissolves in water to give a clear solution, and dyes cotton and regenerated cellulose red tints possessing quite good properties of fastness when applied by the following method.

0.2 part of the dyestuff so obtained is dissolved in 50 parts of hot water. The red solution so obtained is poured into a solution of 2 parts by volume of sodium hydroxide solution of 30% strength and 1.2 parts of sodium hydrosulfite in 350 parts of water, the said solution having a temperature of 50° C. 10 parts of cotton are immediately entered, and dyed for 45 minutes at 40 to 50° C. in the presence of 8 parts of sodium chloride. After dyeing, the cotton is oxidized, washed, acidified, well rinsed, and then soaped at the boil.

2 parts of the dyestuff are mixed with 20 parts of urea, the mixture so obtained is dissolved in 36 parts of water and the resulting solution is stirred into 30 parts of a sodium alginate thickening of 5% strength. 9 parts of a sodium carbonate solution of 10% strength, 2 parts of sodium hydrosulfite and 1 part of a 10 N-sodium hydroxide solution are then added.

A cotton fabric is printed with the print paste so prepared. It is then dried, steamed for 8 minutes at 100 to 101° C., rinsed, first cold and then hot, and then soaped for 10 minutes at the boil in a 0.3% solution of a nonionic detergent. There is obtained a red-brown print.

Example 16

A fine suspension of 1.3 parts of 2:5-bis-(1':4'-diamino-2'-anthraquinonyl)-1:3:4-oxidiazole and 1:1 part of 2-chlorobenzthiazole-6-carboxylic acid chloride in 35 parts of nitrobenzene is heated to 170 to 175° C. in the course of 1 hour, and is then stirred at that temperature for 1 hour. 0.5 part of anhydrous pyridine is then added, stirring is continued for 2 hours at 170 to 175° C., and the reaction mixture is then cooled. The dyestuff of the formula

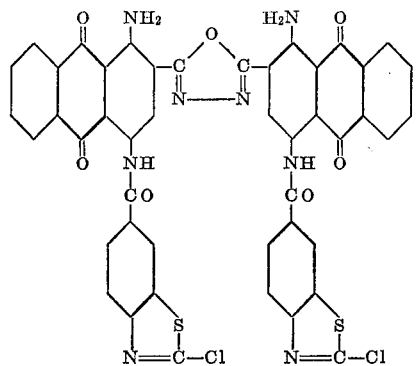

is isolated by filtration, boiled up in ethyl alcohol, isolated by suction filtration, and then dried. It dyes cotton and regenerated cellulose blue tints possessing excellent properties of fastness when applied by the method given in Example 1.

Example 17

A suspension of 1.2 parts of the compound of the formula

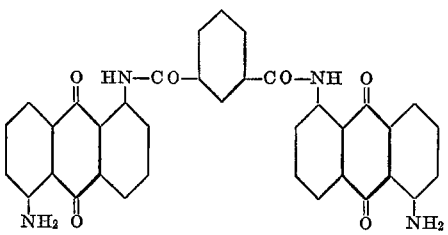

and 0.9 part of 2-chlorobenzthiazole-6-carboxylic acid chloride in 35 parts of nitrobenzene is stirred for 30 minutes at 165° C. and then cooled. The dyestuff of the formula

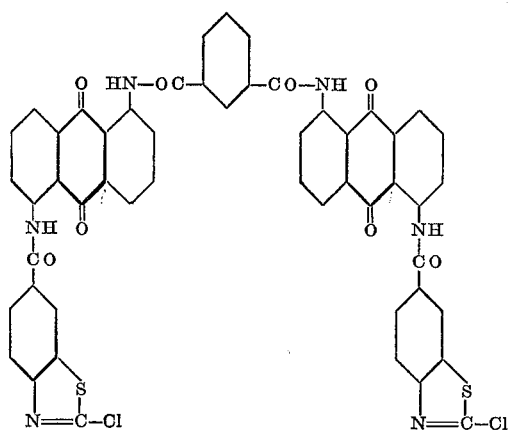

that is isolated by filtration is boiled up in ethyl alcohol, isolated by filtration, and then dried. It is in the form of a dark orange powder that dyes cotton and regenerated cellulose fast yellow tints when applied by the method described in Example 1.

Example 18

A fine suspension of 2.0 parts of the disulfochloride of the formula

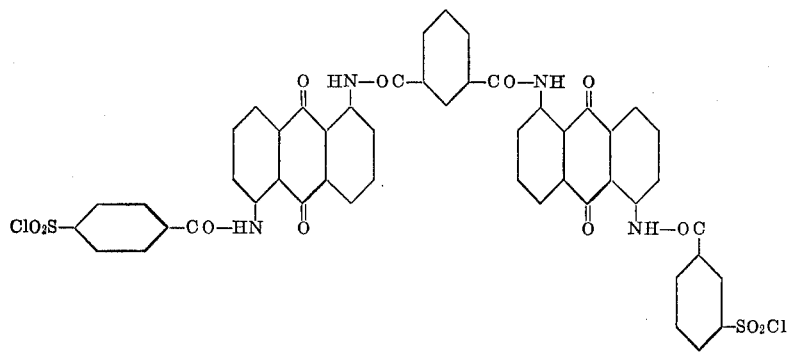

is introduced at room temperature into 18 parts of sulfuric acid of 100% strength. The solution so obtained is then cautiously poured into 80 parts of ice water and 1.59 parts of 2-chloro-6-aminobenzthiazole and 0.2 part of anhydrous sodium carbonate in 30 parts of nitrobenzene and 5 parts by volume of N:N-diethylaniline is stirred for 1 hour at 165° C., cooled, and then diluted with 100 parts of ethanol. The dyestuff of the formula the compound that precipitates thereby is filtered off. The moist filter cake is suspended in 100 parts of water and then exactly neutralized with sodium hydroxide solution of 5% strength. After the addition of 2 parts of sodium chloride, the whole is suction-filtered and the isolated

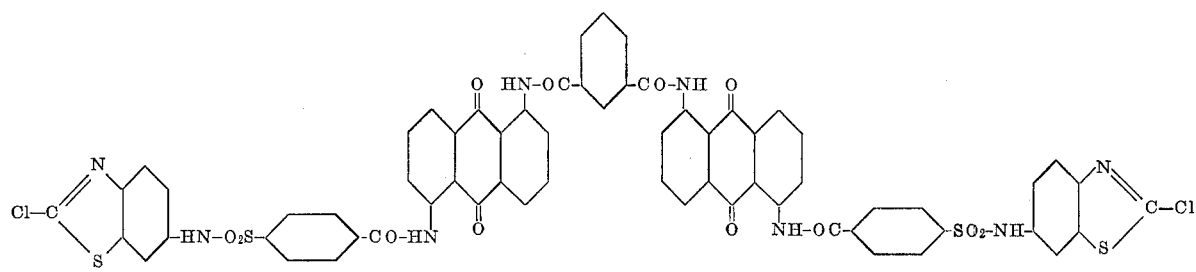

is isolated by filtration, brought shortly to the boil in ethyl alcohol of 80% strength, isolated by filtration and then dried. It is in the form of a light brown powder that dyes cotton and regenerated cellulose fast yellow tints when applied by the method described in Example 1.

Example 19

0.8 part of the compound of the formula

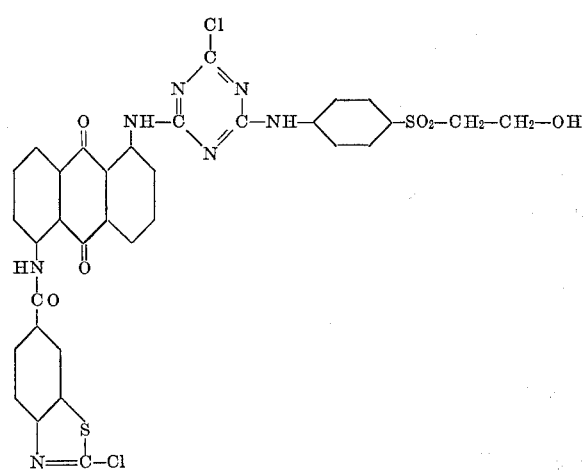

product is dried in vacuo at 60 to 70° C. The new dyestuff so obtained corresponds, as the free acid, to the formula

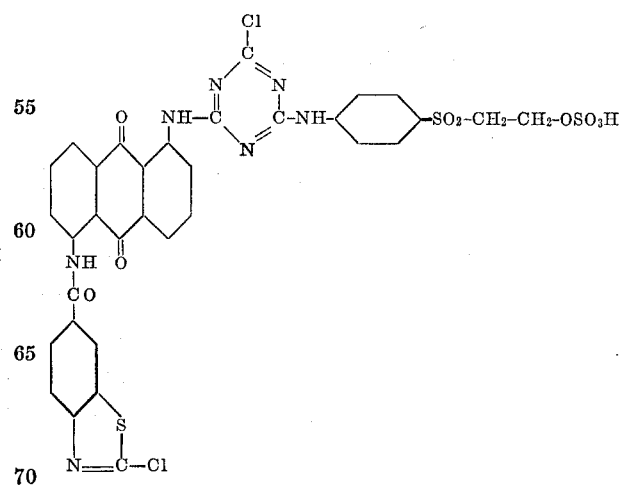

and dyes cotton and regenerated cellulose pure and strong orange tints when applied by the method described in Example 8.

The starting dyestuff can be prepared as follows:
0.86 part of the dyestuff intermediate of the formula

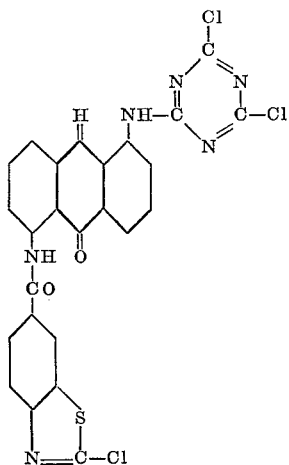

is stirred in 15 parts of nitrobenzene and 1 part of N:N-diethyl-aniline at 140° C. 0.3 part of 1:β-hydroxyethane sulfonyl-4-aminobenzene is then sprinkled in, and the whole is stirred for 6 hours at 140 to 145° C. The resulting solution is diluted with 50 parts of ethyl alcohol. The dyestuff that precipitates thereby is isolated by suction filtration, washed with a small amount of alcohol, and then dried. It is in the form of a light brown powder that contains chlorine and sulfur.

Example 20

9.66 parts of the dyestuff of the formula

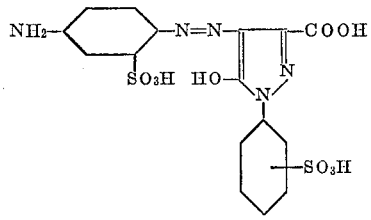

are neutralized in 300 parts of water with sodium carbonate and to the mixture are added 6.56 parts of anhydrous sodium acetate. A solution of 4.64 parts of 2-chlorobenzthiazole-6-carboxylic acid chloride in 50 parts of acetone is then run in at 0 to 5° C. while stirring vigorously. When acylation is complete, the dyestuff is precipitated by the addition of sodium chloride, filtered off and dried.

The dyestuff so obtained dyes cotton yellow tints when applied by one of the dyeing methods (a) and (b) given at the end of this example.

If 8.44 parts of the dyestuff of the formula

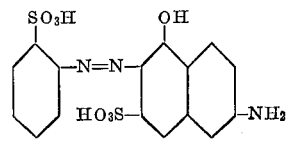

are used in the acylation and the same procedure is adopted as described above, there is obtained a dyestuff that dyes cotton orange tints when applied by method (a) given at the end of this example.

If 8.76 parts of the dyestuff of the formula

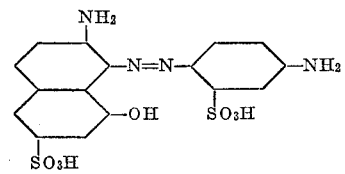

are used in the acylation and the same procedure is adopted as described above, there is obtained a dyestuff that dyes cotton bluish red tints when applied by method (a) given at the end of this example.

(a) 2 parts of the dyestuff described in the first paragraph are dissolved in 100 parts of water. The stock solution so obtained is added to 2900 parts of water at 20° C. After the addition of 30 parts of trisodium phosphate and 60 parts of sodium chloride, there are entered 100 parts of cotton, the temperature is raised to 80° C. within 45 minutes, a further 60 parts of sodium chloride are added, and dyeing is continued for 30 minutes at 90 to 95° C. The dyeing is then rinsed, aftertreated for 15 minutes as the boil in a solution that contains, per liter of water, 2 g. of sodium carbonate and 3 g. of soap, rinsed cold and then dried.

(b) 2 parts of the dyestuff described in the first paragraph and 2 parts of sodium carbonate are dissolved in 25 parts of urea and 75 parts of water. A cotton fabric is impregnated with the solution so obtained, squeezed to give increase in weight of 75%, and then dried at 90 to 100° C. The dyeing is then subjected to the action of dry heat for 60 seconds at 140° C., rinsed and then soaped.

Products are obtained that dye cotton the tints listed in Column II of the following table when the dyestuffs containing amino groups that are listed in Column I are acylated with 2-chloro-benzthiazole-6-carboxylic acid chloride by the same process.

TABLE

| I | II |
|---|---|
| O—Cu—O structure with -N=N-, HO₃S, -NH, SO₃H | Ruby. |
| O—Cu—O structure with NH₂, -N=N-, HO₃S, SO₃H, SO₃H | Violet. |

TABLE—Continued

| I | II |
|---|---|
| 1:2 cobalt complex of 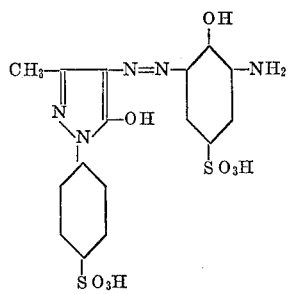 | Yellowish brown. |
| 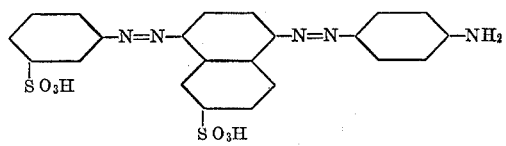 | Red-brown. |
| Mono-para-aminophenylamide of copper phthalocyanine-3:3′:3″:3′″-tetra-sulfonic acid. | Turquoise. |

Example 21

5.5 parts of 6-amino-2-chlorobenzthiazole of the formula

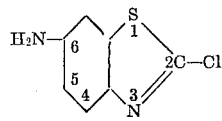

the manufacture of which is described in U.S. Pat. No. 2,659,730, patented Nov. 17, 1953 by Leon Katz, Cincinnati, Ohio, are suspended in 300 parts of water and then diazotized in the usual manner with 9 parts of concentrated hydrochloric acid and 15 parts of a 2 N-sodium nitrite solution. The solution of the diazonium salt so obtained is poured into a solution of 10.8 parts of 1-hydroxy-8-acetylamino-naphthalene-3:6-disulfonic acid in 200 parts of water and 20 parts of sodium carbonate. When coupling is terminated, the precipitated dyestuff is filtered off, washed with a sodium chloride solution of 10% strength and then dried in vacuo at 60 to 65° C.

The dyestuff so obtained dyes cotton bluish red tints.

If, instead of 1-hydroxy-8-acetylamino-naphthalene-3:6-disulfonic acid, there are used the coupling components listed in Column I of the following table, there are obtained dyestuffs that dye cotton the tints listed in Column II.

| I | II |
|---|---|
| 1-(2′:5′ - dichlorophenyl) - 3 - methyl 5-pyrazolone-4′-sulfonic acid | Golden yellow. |
| 2 - hydroxynaphthalene - 6:8-disulfonic acid | Orange. |
| Copper complex of 2:2′:4-trihydroxy-azobenzene - 5′ - sulfonic acid | Brown. |
| 1 - hydroxy - 8 - aminonaphthalene-5:7-disulfonic acid | Violet. |
| 2 - hydroxynaphthalene - 3:6 - disulfonic acid | Scarlet. |
| 1-hydroxy - 8 - benzoylamino-naphthalene - 3:6-disulfonic acid | Bluish red. |
| 1 - hydroxy - 8 - acetylamino-naphthalene - 3:5 - disulfonic acid | Bluish red. |
| 1 - hydroxy - 6 - acetylamino-naphthalene - 3 - sulfonic acid | Red. |
| 1 - phenyl - 3 - carboxy - 5 - pyrazolone-3′ - sulfonic acid | Yellow. |
| 1-naphthyl - (2′) - 3 - methyl-5-pyrazolone - 4′:6′:8′ - trisulfonic acid | Reddish yellow. |

Example 22

5.5 parts of 6-amino-2-chlorobenzthiazole are diazotized in the manner described in Example 21, and then added to a solution that contains 3.24 parts of para-cresol, 30 parts by volume of 1 N-sodium hydroxide solution and 13 parts of sodium carbonate.

The dyestuff so obtained can be used as a disperse dyestuff. It yields yellow dyeings possessing excellent fastness to washing on nylon.

Example 23

8.76 parts of the dyestuff of the formula

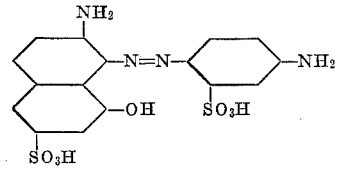

are dissolved neutral in 300 parts of water at room temperature and to the solution so obtained are added 6.7 parts of anhydrous sodium acetate. To this solution is added a fine suspension of 8.04 parts of 2-chlorobenzthiazole-6-sulfochloride in 70 parts of acetone while stirring vigorously. The sulfonamide formation is completed after several hours.

The dyestuff so obtained dyes cotton bluish red tints.

The 2-chloro-benzthiazole-6-sulfochloride is prepared by the chlorosulfonation of 2-hydroxybenzthiazole with chlorosulfonic acid followed by reaction with phosphorus pentachloride and phosphorus oxychloride.

Example 24

To a neutral suspension of sulfochloride (prepared according to the method described in Example 3 of U.S. patent application Ser. No. 677,798, filed Aug. 12, 1957 by Eugen Koller, from 11.5 parts of copper phthalocyanine) in 300 parts of water is added a solution of 5.53 parts of 6-amino-2-chlorobenzthiazole in 100 parts of acetone and the whole is heated to 30 to 35° C. The pH value of the reaction mixture is maintained between 6 and 8 for several hours by the dropwise addition of 1 N-sodium hydroxide solution. When the reaction is complete, the precipitated dyestuff is filtered off and dried in vacuo at 60° C.

The dyestuff so obtained dyes cotton turquoise blue tints.

Example 25

18.45 parts of 6-amino-2-chlorobenzthiazole are diazotized in the manner described in Example 21, and then added to a weakly alkaline aqueous solution of 2-methyl-4,β-cyanoethyl-phenol. A yellow dyestuff of the formula

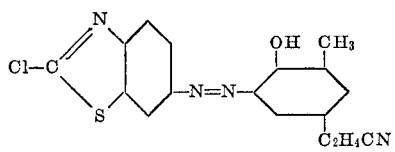

separates. The dyestuff is insoluble in water, but dissolves in organic solvents with a bright yellow color. It dyes synthetic fibers, such as nylon or polyester fibers, but also silk, wool or cellulose fibers yellow shades having excellent wet fastness.

If, instead of 2-methyl-4,β-cyanoethyl-phenol, there are used the coupling components listed in column I of the following table, there are obtained dyestuffs that dye polyester fabric the tints listed in column II.

| | I | II |
|---|---|---|
| 1 | 3-methyl-pyrazolone | Yellow. |
| 2 | 2-naphthol | Orange. |
| 3 | N,N-dimethylaniline | Yellow. |
| 4 | p-chlorophenol | Do. |
| 5 | N-(2-hydroxyethyl)-N-ethyl-aniline | Do. |
| 6 | N,N-di-(2-hydroxyethyl)-aniline | Do. |
| 7 | N-(2-cyanethyl)-N-(2-hydroxtethyl)-anilin | Do. |
| 8 | N-(β-cyanethyl)-N-(β-methoxyethyl)-3-benzamido-5-methoxy-aniline | Orange. |
| 9 | 1-hydroxy-4-chloro-naphthalene | Red. |
| 10 | N-phenyl-N-methyl-1-hydroxy-7-aminonaphthalene-3-sulfamide | Red. |
| 11 | 2-hydroxynaphthalene-6-sulfonic acid N-ethylamide | Red. |
| 12 | 1-hydroxynaphthalene-3-sulfonic acid N-ethylamide | Red. |

We claim:

1. A water-insoluble azo dyestuff of the formula

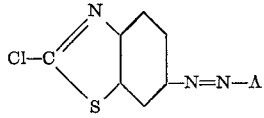

wherein A is a residue selected from the group consisting of amino - benzene, hydroxy - benzene, hydroxy - naphthalene, pyrazolone and hydroxy-azobenzene which is free from water-solubilizing groups.

2. A dyestuff according to claim 1, wherein A is the residue of a phenol or naphthol.

3. A dyestuff according to claim 1, wherein A is the residue of an aniline.

4. A dyestuff according to claim 1, wherein A is the residue of a pyrazolone.

5. A dyestuff according to claim 2 of the formula

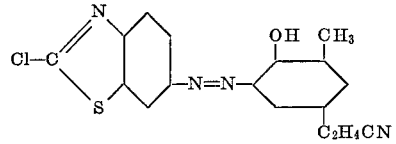

6. A dyestuff according to claim 3 of the formula

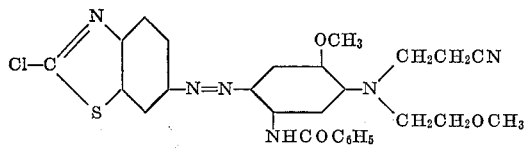

7. A dyestuff according to claim 4 of the formula

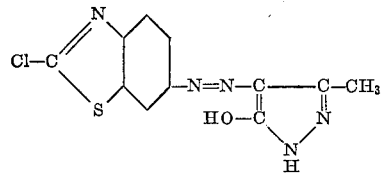

References Cited

UNITED STATES PATENTS

3,371,082   2/1968   Mangini et al. _____ 260—158

FOREIGN PATENTS

1,290,839   3/1962   France.
Ad. 80,225   2/1963   France.

FLOYD DALE HIGEL, Primary Examiner

U.S. Cl. X.R.

8—4, 13, 41, 50, 51, 63, 71; 260—146, 147, 153, 155, 244, 303, 304, 351, 355, 377